Nov. 18, 1969  E. E. McCULLOUGH  3,478,762
COUPLING AND VALVE ASSEMBLY
Filed March 10, 1967

INVENTOR.
EDWARD E McCULLOUGH
BY Edwin D. Grant

ATTORNEY

United States Patent Office 3,478,762
Patented Nov. 18, 1969

3,478,762
COUPLING AND VALVE ASSEMBLY
Edward E. McCullough, Brigham City, Utah, assignor to Thiokol Chemical Corporation, Bristol, Pa., a corporation of Delaware
Filed Mar. 10, 1967, Ser. No. 622,169
Int. Cl. F16l 29/00, 37/28
U.S. Cl. 137—71                                    4 Claims

ABSTRACT OF THE DISCLOSURE

Two couplings joined by separable means are each provided with a biased poppet that seats against a shoulder in the orifice of the respective coupling when the couplings separate, sealing said orifice. Before coupling disconnection, a positioning member spaces one poppet from its seat and pressure spaces the other poppet from its seat.

---

This invention relates to a coupling and valve assembly by means of which a fluid supply conduit can be rapidly disconnected with simultaneous closure of each disconnected end of said conduit. Although a coupling and valve assembly in accordance with the invention has other applications, it is particularly advantageous for separating fluid supply conduits in rocket motors.

It is accordingly an object of this invention to provide a coupling and valve assembly that can be actuated from a point remote therefrom to disconnect two segments of a fluid supply conduit and simultaneously to seal the ends of said segments.

Another object of this invention is to provide a severable, self-sealing coupling that is uncomplicated in design and thus inexpensive to manufacture.

The aforesaid and other objects of the invention are attained through a coupling and valve assembly that is described hereinafter and illustrated in the accompanying drawings, wherein the same parts are designated with the same numbers.

Figure 1:
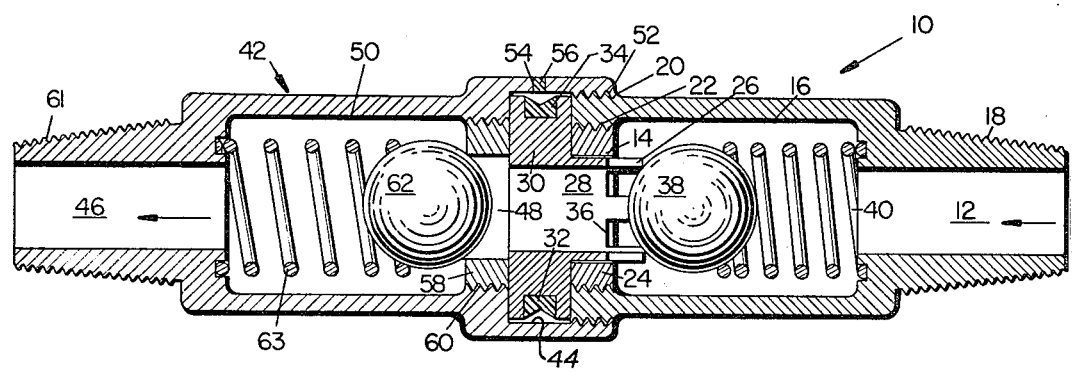
Figure 2:
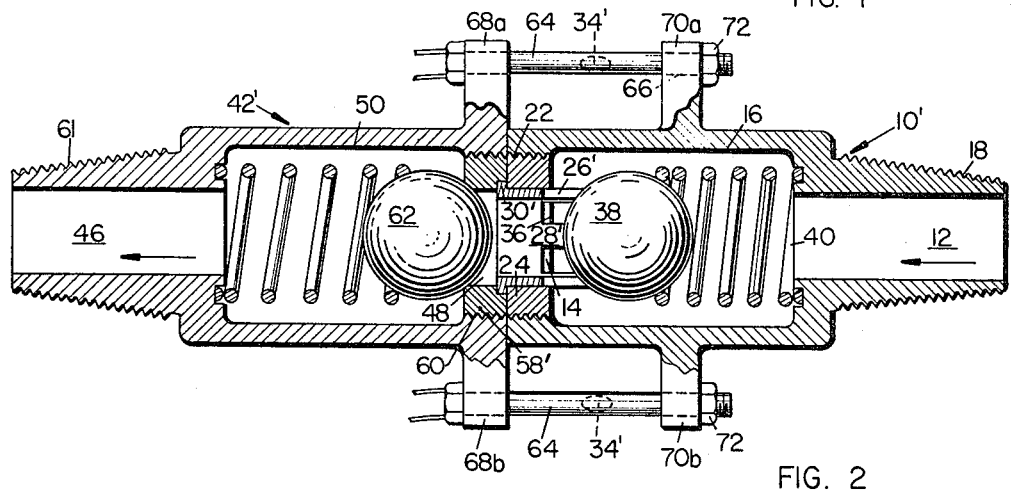

In the drawings:
FIGURE 1 is a sectional view taken along the longitudinal axis of a preferred embodiment of the invention; and
FIGURE 2 is a sectional view taken along the longitudinal axis of a second embodiment of the invention.

As illustrated in FIGURE 1, a coupling and valve assembly in accordance with the invention comprises a first coupling (generally designated by the number 10) having an inlet 12 and an outlet 14 at opposite ends thereof and a bore 16 with a larger diameter than that of either said inlet or outlet extending therebetween. More particularly, the inlet end of first coupling 10 is formed with threads 18 to facilitate the attachment of a conduit (not shown) thereto and the outlet end of said coupling is formed with both external threads 20 and internal threads 22, a first ring 24 in which outlet 14 is formed being engaged with the latter.

A positioning member (generally designated by the number 26) comprises a first tubular portion 28 which is slidably engaged within outlet 14 and which extends into bore 16, and a second annular portion 30 that extends radially of the outer end of said first portion 28 and abuts the end surface of first coupling which is adjacent said outlet. The periphery of second portion 30 of positioning member 26 has a circumferentially extending groove 32 therein, and an annular shaped explosive charge 34 is disposed within this groove. The inner end of first portion 28 of positioning member 26 is provided with a plurality of longitudinally extending slots 36.

Seated against the inner end of first portion 28 of positioning member 26 is an outlet seal member 38 in the form of a ball having a diameter larger than that of outlet 14, said outlet seal member being urged toward said outlet 14 by a spring 40 disposed within bore 16.

The described coupling and valve assembly also comprises a second coupling (generally designated by number 42) having at one end a counterbore 44 in which second portion 30 of positioning member 26 is seated, at the other end an outlet 46, an inlet 48 extending from the bottom surface of said counterbore 44 and communicating with the aperture in said second portion 30 of positioning member 26, and a bore 50 with a larger diameter than that of either said inlet 48 or outlet 46 extending therebetween. At the end portion of counterbore 44 are threads 52 that engage the threads 20 on the outlet end of first closure 10 to form joining means to join couplings 10 and 42, and extending through the portion of the wall of second coupling 42 which defines said counterbore is an aperture 54 in which an igniter 56 is fixedly positioned. The inlet 48 of second coupling 42 extends through a second ring 58 that is engaged with threads 60 extending between the bottom surface of counterbore 44 and bore 50. For the purpose of interpretation of claims appended hereto, ring 58 of second coupling 42 and ring 24 of first coupling 10 are to be considered as being integral parts of said first and second couplings, respectively. The outlet end of second coupling is also formed with threads 61 to facilitate the attachment of a conduit (not shown) thereto.

Disposed within bore 50 is an inlet seal member 62 in the form of a ball having a diameter larger than that of inlet 48, said inlet seal member being urged toward said inlet by a spring 63 also disposed within said bore.

Fluid flow through the aforedescribed coupling and valve assembly is in the direction indicated by arrows in the drawings. The slots 36 in first portion 28 of positioning member 26 permit flow from bore 16 of first coupling 10 to the aperture in said positioning member and to inlet 48 of second coupling 42. Obviously there will be flow through the coupling and valve assembly only when fluid pressure within inlet 48 is sufficient to move inlet seal member 62 away from said inlet.

When separation of first coupling 10 and second coupling 42 is desired, igniter 56 can be actuated by passing electric current through the leads (not shown) thereof, whereupon the flame from said igniter detonates the explosive charge 34 and the wall of second coupling 42 is severed circumferentially of counterbore 44. Positioning member 26 is then ejected from outlet 14 by the force exerted thereon by spring 40 acting through outlet seal member 38, and said outlet seal member seats against first coupling 10 at the inner edge of said outlet to close the latter. Inlet seal member 62 also seats against second coupling 42 at the inner edge of inlet 48 when said second coupling separates from first coupling 10, thereby closing said inlet 48.

The construction of the disclosed coupling and valve assembly is such that all components can readily be manufactured. Furthermore, the components of the embodiment can readily be varied in size to provide the required strength thereof for particular applications. For example, the radial thickness of second portion 30 of positioning member 26 can be greater than illustrated in the drawing, if it is desired to provide greater resistance of said second portion 30 to the forces exerted thereon by the explosion of charge 34.

A second embodiment of the invention is illustrated in FIGURE 2. This embodiment is essentially the same as that described above except that it is modified for use of explosive bolts 64 as a separation means, rather than the annular shaped charge 34. Hence, the shaped explosive charge 34 is eliminated and replaced by an explosive charge 34′ in each of two explosive bolts 64 that extend through holes 66 in two lugs 68a, 68b, 70a, 70b which are integrally formed on each coupling member 10' and 42' and which project laterally from diametrically opposed points thereon, said bolts 64 and their nuts 72 holding said coupling members together in sealed, abutting arrangement. The portion of coupling 42' having the counterbore 44 is eliminated in this embodiment. Also, the second annular portion 30' of the positioning member 26' may be smaller as shown.

Operation of this embodiment of the invention is identical to that previously described, except that coupling members 10' and 42' are separated by detonation of the explosive charges in bolts 64.

What is claimed is:
1. A coupling and valve assembly comprising:
    a first coupling having an inlet and an outlet at opposite ends thereof and a bore with a larger diameter than that of either said inlet or outlet extending therebetween;
    a removable positioning member comprising a first portion having at least one opening extending through said outlet of said first coupling and into said bore thereof and a second annular portion extending radially of the outer end of said first portion and abutting the end surface of said first coupling which is adjacent said outlet thereof;
    an outlet seal member disposed within said bore and abutting the inner end of said first portion of said positioning member, in a position thereat to provide fluid flow through said opening, removal of said first portion of said positioning member from said bore of said first coupling permitting said outlet seal member to seat against said first coupling adjacent said outlet thereof and thereby to close the latter;
    spring means disposed within said bore to urge said outlet seal member toward said outlet of said first coupling;
    a second coupling having at one end a counterbore into which said second portion of said positioning member is seated, at the other end an outlet, an inlet extending from said counterbore and communicating with the interior of said positioning member, and a bore with a larger diameter than that of either said inlet or outlet extending therebetween, the inlet end of said second coupling being sealably joined to the outlet end of said first coupling;
    an inlet seal member disposed within said bore of said second coupling;
    spring means disposed within said bore of said second coupling to urge said inlet seal member toward said inlet of said second coupling, said inlet seal member being movable away from said inlet by fluid pressure therein; said first mentioned spring means being sufficient to urge said positioning member out of said first coupling bore when said couplings are out of abutting relationship;
    joining means for retaining said couplings in sealed abutting relationship and confining said positioning member therebetween;
    at least oe explosive charge carried by said coupling and valve assembly for severing said joining means on detonation; and
    means for detonating said charge.
2. The coupling and valve assembly of claim 1 wherein:
    said joining means is a thin wall formed by a counterbore in the end of one of said couplings that abuts the other said coupling, said wall being threadedly engaged at its outer end to said other coupling; and
    said explosive charge is an annular, shaped charge disposed within an annular groove in the outer surface of said second portion of said positioning member, and shaped so that force produced by detonation thereof is directed toward said wall for severance thereof.
3. The coupling and valve assembly of claim 1 wherein:
    said joining means comprises lugs on each of said couplings, said lugs having holes therein, and nut-equipped, explosive bolts passing through said holes in corresponding lugs on each of said couplings, so that said couplings are thereby held together; and
    said explosive charge is incased within each said explosive bolt, whereby detonation thereof severs said bolts to release said couplings.
4. A coupling and valve assembly as defined in claim 1 wherein:
    said first portion of said positioning member is tubular and said opening is in the portion of its wall disposed within said bore of said first coupling; and
    said outlet seal member and inlet seal member are spherical.

References Cited
UNITED STATES PATENTS

| 1,415,124 | 5/1922 | Skelly | 137—614.05 |
| 2,804,317 | 8/1957 | Prater | 137—68 |
| 2,809,584 | 10/1957 | Smith | 285—3 XR |
| 3,043,542 | 7/1962 | Neuschotz | 137—68 XR |

WILLIAM F. O'DEA, Primary Examiner

R. GERARD, Assistant Examiner

U.S. Cl. X.R.

89—1; 137—614.05; 285—3